(12) United States Patent
Lange et al.

(10) Patent No.: US 7,810,237 B2
(45) Date of Patent: Oct. 12, 2010

(54) METHOD FOR REPAIRING AND/OR MODIFYING COMPONENT PARTS OF A GAS TURBINE

(75) Inventors: Anja Lange, Langenhagen (DE); Jens Lange, Langenhagen (DE); Uwe Schulze, Winsen (DE)

(73) Assignee: MTU Aero Engines GmbH, Munich (DE)

( * ) Notice: Subject to any disclaimer, the term of this patent is extended or adjusted under 35 U.S.C. 154(b) by 237 days.

(21) Appl. No.: 10/555,111

(22) PCT Filed: Apr. 1, 2004

(86) PCT No.: PCT/DE2004/000673

§ 371 (c)(1),
(2), (4) Date: Dec. 26, 2006

(87) PCT Pub. No.: WO2004/096487

PCT Pub. Date: Nov. 11, 2004

(65) Prior Publication Data

US 2007/0084047 A1    Apr. 19, 2007

(30) Foreign Application Priority Data

Apr. 30, 2003    (DE) ............................... 103 19 494

(51) Int. Cl.
*B23P 6/00*    (2006.01)
(52) U.S. Cl. .................. 29/889.1; 29/889.7; 29/402.09; 29/402.11; 700/98; 700/119

(58) Field of Classification Search .............. 29/402.09, 29/402.16, 402.18, 889, 889.1, 889.7; 700/96–98, 700/117–120, 159–161, 163, 166, 182, 195, 700/212, 21; 219/121
See application file for complete search history.

(56) References Cited

U.S. PATENT DOCUMENTS 5,269,057 A    12/1993    Mendham
(Continued)

FOREIGN PATENT DOCUMENTS

DE    196 46 702    5/1997
(Continued)

OTHER PUBLICATIONS

Li et al., "A Reverse Engineering System for Rapid Manufacturing of Complex Objects," Robotics and Computer Integrated Manufacturing, Pergamon Press, Oxford, GB, vol. 18, No. 1, Feb. 2002, p. 53 to 67, XP004312337, ISSN: 0736-5845, p. 1, line 17 to line 23.

(Continued)

*Primary Examiner*—David P Bryant
*Assistant Examiner*—Ryan J Walters
(74) *Attorney, Agent, or Firm*—Kenyon & Kenyon LLP

(57) ABSTRACT

A method is for repairing and/or modifying component parts of a gas turbine. First, at least one, particularly damaged section of the component part that is to be repaired is cut out of the component part. In addition, if it does not exist, a data record is generated for a replacement part that is to be produced. The replacement part is subsequently produced with the aid of a rapid manufacturing process. Subsequently, the replacement part produced is integrated into the component part that is to be repaired.

13 Claims, 3 Drawing Sheets

U.S. PATENT DOCUMENTS

| | | |
|---|---|---|
| 6,269,540 B1 | 8/2001 | Islam et al. |
| 6,705,383 B2 | 3/2004 | Beeck et al. |
| 6,856,846 B2 * | 2/2005 | Fuki et al. .................... 700/98 |
| 6,861,613 B1 | 3/2005 | Meiners et al. |
| 2001/0014403 A1 | 8/2001 | Brown et al. |
| 2002/0059049 A1 * | 5/2002 | Bradbury et al. .............. 703/11 |
| 2002/0166220 A1 * | 11/2002 | Imundo et al. ........... 29/402.09 |
| 2003/0105538 A1 | 6/2003 | Wooten |
| 2005/0036135 A1 * | 2/2005 | Earthman et al. ........ 356/237.1 |

FOREIGN PATENT DOCUMENTS

| | | |
|---|---|---|
| DE | 100 64 267 | 7/2002 |
| EP | 1 231 010 | 8/2002 |
| EP | 1 143 106 | 8/2005 |
| GB | 2 307 547 | 5/1997 |

OTHER PUBLICATIONS

Haferkamp et al., "Rapid Manufacturing Durch Lasersintern und 3D-Laserstrahl-Auftragschweissen Rapid Manufacturing by Laser Sintering and Laser Cladding" Laser und Optoelektronik, Fachverlag GmbH, Stuttgart, DE, vol. 27, No. 3, Jun. 1995, pp. 64 to 69, XP000955177, ISSN: 0722-9003.

Ahlers, et al., "Rapid tooling: a new approach to integrated product and process development," *Rapid Prototyping and Flexible Manufacturing*, Proceedings of SPIE 3102: 45-111, 1997.

Gebhardt, *Rapid Prototyping*, Muenchen: Carl Hanser Verlag, 1996.

\* cited by examiner

METHOD FOR REPAIRING AND/OR MODIFYING COMPONENT PARTS OF A GAS TURBINE

FIELD OF THE INVENTION

The present invention relates to a method for repairing and/or modifying component parts of a gas turbine.

BACKGROUND INFORMATION

Gas turbines, such as, for example, aircraft power plants, are subject to great stress, and, for this reason, defective regions in the power plant may be created during operation. In this connection, it may important that the defective regions of the power plant be able to be repaired quickly and cost-effectively. The present invention relates to a method for repairing component parts, e.g., of stationary component parts, of a gas turbine, such as, for example, the fixed stator blades of an aircraft power plant. However, example embodiments of the present invention may also be used for the structural modification and/or local material modification of component parts of a gas turbine.

For the repair of defective regions, such as cracks, wear and corrosion phenomena that lower wall thicknesses, in gas turbines, conventionally, welding methods or high-temperature soldering methods are used. These two conventional repair methods have limits with regard to their repairable crack widths and wall thicknesses, as well as the inducing of stress in the case of materials susceptible to hot cracking. Defective regions because of impact damage, which lead to deformations and cracking of the material, are not repairable by conventional repair methods. Accordingly, using welding methods or high temperature soldering methods, only limited appearances of damage in power plant component parts are able to be repaired. For the repair of larger defective regions and for the structural modification or local material modification, it is conventional that one may produce replacement parts by investment casting according to the lost-wax process However, this requires costly and time-consuming model construction or mold construction.

SUMMARY

Example embodiments of the present invention relate to a method for the repair and/or modification of components of a gas turbine.

According to a method of an example embodiment of the present invention for the repair and/or modification of component parts of a gas turbine, first of all, at least a section of the component part, that is to be repaired or modified, is roughed out of the component part, e.g., cut out. Subsequently, at least at the first repair or modification of this section of the component part, a data record is generated for a replacement part that is to be produced. The replacement part is subsequently produced with the aid of a rapid manufacturing process. Thereafter the produced replacement part is integrated into the component part that is to be repaired or modified.

Using the method according to an example embodiment of the present invention, a repair or modification may be made without building a model or a mold. This may have significant cost advantages, e.g., in the case of a limited number of pieces. Moreover, a quick repair may be possible. This may provide an abbreviated processing time of the component parts to be repaired. An additional advantage is that the interconnecting region of replacement part and component part is variable, and thereby may be put into zones of low stress. The replacement parts may be produced of the same or of a material other than that of the component part to be repaired or modified. Then, too, damage may be mended which, conventionally, may not have been reparable.

According to an example embodiment of the present invention, the damaged section of the component part to be repaired and, in addition, a tolerance section adjacent to the damaged section are cut out from the component part. By doing this, regions of the component part that were possibly damaged before may be mended too.

This may reduce the susceptibility to consequential damage, and thereby may increase the operating time of the repaired component part.

Example embodiments of the present invention are explained in detail below with reference to the appended Figures.

DETAILED DESCRIPTION

The method according to an example embodiment of the present invention for the repair and/or modification of component parts, e.g., of stationary component parts, of a gas turbine is explained in detail below, with reference to FIGS. 1 to 3.

Figure 1:
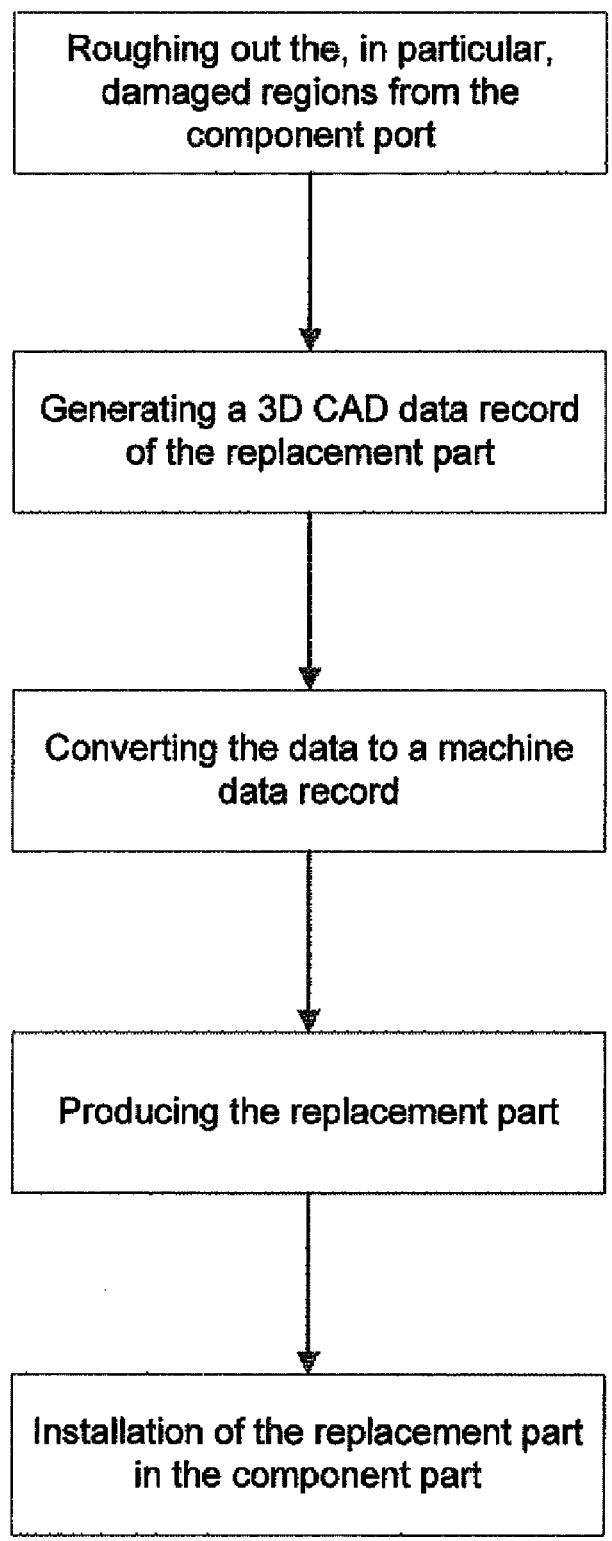
FIG. 1 is a schematic block diagram to clarify a method according to an example embodiment of the present invention for repairing component parts of a gas turbine.

FIG. 1 is a schematic block diagram or flow chart for making clearer the method according to an example embodiment of the present invention. For the repair or modification of a component part of a gas turbine, after the identification of a particularly damaged section of the component part of the gas turbine that is to be repaired or modified, at least this section is roughed out, e.g., cut out. Before or subsequently, a data record is generated for a replacement part that is to be produced. The replacement part is subsequently produced with the aid of a rapid manufacturing process. Thereafter the produced replacement part is integrated into the component part that is to be repaired or modified. Accordingly, the method includes roughing out the damaged region of the component part, e.g., cutting it out, and producing a corresponding replacement part with the aid of a rapid manufacturing process.

Below, individual method steps are further described, which were shown and described very briefly above.

The damaged section, in particular, of the component part to be repaired or modified is roughed out of the component part with the aid of an electroerosive or mechanically separating or removing method. In this context, it is within the present context, during the course of repairing the component part, not only to rough out the damaged section, but also to rough out, in addition to the damaged section, a tolerance section adjacent to the damaged section. This may provide that, in addition to the damaged section, possibly formerly damaged or fatigued regions of the component part to be repaired may be cut out of the component part, together with the damaged section. By doing this, a repaired component part may be less susceptible, after the repair, to renewed damage in the region of the repaired section.

In connection with the carving out of the damaged (in the case of repair of the component part) or even the undamaged section (in the case of a modification of the component part) from the component part, it should be noted that, if there is systematic damage to the component part, or an appropriate modification is being undertaken, the carving out of the damaged section may be performed using a device especially adapted to this. However, the assumption for this is a reproducible geometry of the component part that is to be repaired or modified after different prestressings. In this instance, manufacturing tolerances and deformations additionally occurring in the operation of the gas turbine, wear or other stresses should permit a uniform geometry of the replacement part that is to be produced. In subsequent repairs or modifications of the same section of the component part, one may omit, in this case, the steps illustrated in FIG. 1: generating a 3D data record of the replacement part, converting the data into a machine data record.

By contrast, if considering a non-systematic damage to the component part, the damaged section is individually roughed out of the component part that is to be repaired, that is, without an appropriate adapted device. This also applies if manufacturing tolerances, and deformations of same occurring in the operation of the gas turbine, do not permit a uniform geometry of the replacement part that is to be produced.

After, or even before the roughing out, e.g., the cutting out, of the particularly damaged section as well as possibly of a tolerance section adjacent to the damaged section, from the component part to be repaired, a data record is generated for the replacement part that is to be produced. In this connection, first a three-dimensional CAD data record is generated for the replacement part that is to be produced. This 3D CAD data record for the replacement part that is to be produced is subsequently converted to a machine data record. This is commented on in greater detail below.

Figure 2:
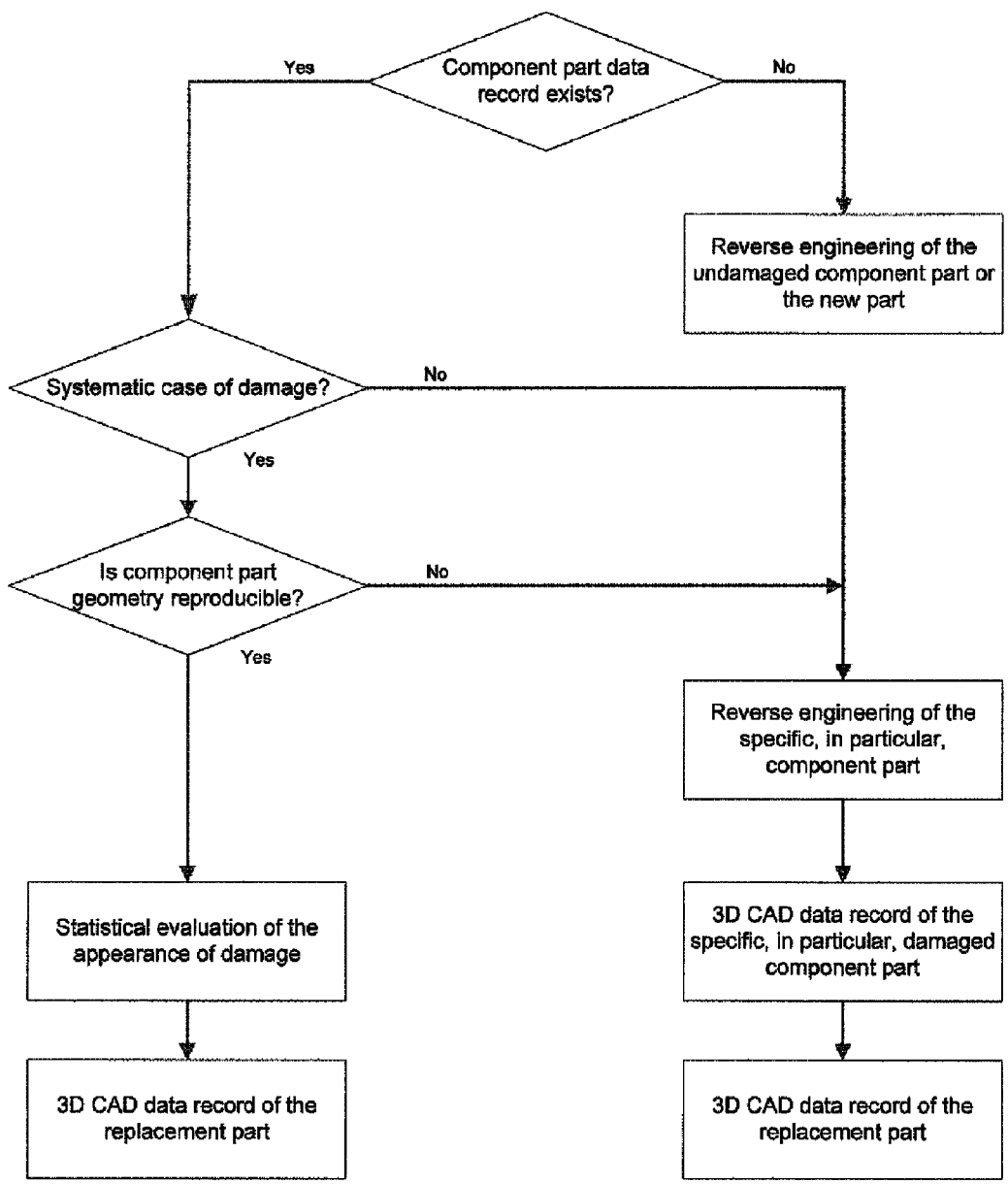
FIG. 2 is a schematic block diagram of a processing step of the method illustrated in FIG. 1.

The creation of the 3D CAD data record of the replacement part, that is to be produced, is clarified in the block diagram or flow chart illustrated FIG. 2. At first it is checked whether there is a 3D CAD data record for the component part that is to be repaired or modified but is undamaged, or for a corresponding new part. If there is such a 3D CAD data record for the undamaged component part, it is checked subsequently whether, first of all, there has been a systematic damage of the component part, and secondly, whether the geometry of the damaged component part is reproducible. In the instance in which there is both a systematic damage of the component part and, at the same time, the geometry of the damaged component part is reproducible, then, in the light of statistical evaluations of the size of the damaged section of the component part, that is to be repaired, as well as while taking into consideration of a tolerance section adjacent to the damaged section, which takes into consideration predamaged material regions and greatly stressed regions of the component part during the repair, the required geometry of the replacement part that is to be produced may be derived, and from this the 3D CAD data record may be generated. The 3D data record may then be used for all subsequent repairs and/or modifications of the same section. If, on the other hand, there is no systematic damage of the component part that is to be repaired, and/or if the geometry of the component part that is damaged or that is to be modified is not reproducible, reverse engineering of the component part or at least of the relevant component part regions is performed. In order to carry out the reverse engineering of the component part or the component part region, at first the, in particular, damaged section as well as possibly the tolerance section adjacent to the damaged section are roughed out of the damaged component part that is to be repaired. There follows a measurement of the component part or the component part partial region, for example, by mechanical or optical sensing devices, or by computer tomography and subsequent surface feedback. As a result, one obtains a 3D CAD data record of the damaged or the to-be-modified component part or component part region, from which previously the damaged section, and possibly a tolerance section had been roughed out. From this 3D CAD data record of the processed component part or component part region, by difference formation, using the 3D CAD data record of the undamaged component part, the 3D CAD data record of the replacement part, that is to be produced, is ascertained. In this connection, it may be provided to correct the difference formation manually or by appropriate mathematical methods, in order to take into consideration, for example, manufacturing tolerances and deformations or wear of the component part during the operation of the gas turbine.

In connection with the ascertainment described above of the 3D CAD data record of the replacement part that is to be produced, it is assumed that a 3D CAD data record of the undamaged component part or of an appropriate new part exists. If no such data record for the undamaged component part exists, then, in the preliminary stage illustrated in FIG. 2, reverse engineering of the undamaged component part or the corresponding new part is carried out. This too may be done using mechanical or optical sensors or computer tomography, and subsequent surface feedback. After the ascertainment or generation of the 3D CAD data record for the undamaged component part, one may continue, as described above.

If, in connection with the repair of the component part of the gas turbine, a structural modification of the component part is to take place, for example, a reinforcement or a reduction in a wall thickness of the component part, or an increase in a transition radius, so-called connecting measurements are determined for the component part that is to be repaired. In this instance, the 3D CAD data record of the replacement part, that is to be produced, is created by a combination of reverse engineering and forward engineering.

As mentioned above, the 3D CAD data record of the replacement part, that is to be produced, is converted to a machine data record. The 3D CAD data record of the replacement part, that is to be produced, is machine-independent. The production of the replacement part, that is to be produced, takes place on a machine that is dependent upon a rapid manufacturing method used. The machine-independent 3D CAD data record accordingly has to be transformed into a machine-readable data record. For this, there takes place the conversion of the 3D CAD data record of the replacement part that is to be produced into the machine data record.

After the, in particular, damaged section and possibly an adjacent tolerance section has been roughed out of the component part that is to be repaired or modified, and after a machine data record has been generated for the replacement part that is to be produced, the production of the replacement part takes place with the aid of a rapid manufacturing process. As the rapid manufacturing process, selective laser sintering, SLS, for short, or selective laser melting, SLM, for short, or laser beam generation, LG, for short, etc., may be used.

In connection with the above-named rapid manufacturing processes, it should be noted that selective laser sintering (SLS) is a periodic two-step process, in which a defined layer of fine-grain metal powder is applied to a substrate, and the contour of the replacement part is scanned by a laser beam. In this context, grains are sintered to the defined layer as well as to the substrate. Subsequently, the substrate is lowered away, a specified powder layer is again applied, and, in turn, the contour of the next layer is scanned such that a binding takes place with the grains of the lower layer and the current layer.

Porosities appearing in the sintering process, on the replacement part that is to be produced, may be minimized by a parameter optimization and possibly suitable aftertreatment. The mechanical properties of the replacement part, that is to be produced, are then primarily determined by the residual porosities.

Selective laser melting (SLM) is comparable to selective laser sintering. One difference is that in selective laser melting, the grains are completely melted, so that an almost 100% material thickness without porosities may be achieved. Therefore, with the aid of selective laser melting, mechanical rigidity characteristics values for the replacement part thus produced may be achieved, which correspond to the specification of the material used to the greatest extent. In both selective laser sintering and in selective laser melting there are nearly unlimited freedoms in the geometry of the replacement part to be produced.

Laser beam generation (LG) may only make possible the production of replacement parts having lower geometrical complexity. By contrast to selective laser sintering and selective laser melting, in laser beam generation a continuous method may be involved, in which a powder or a wire are brought directly into a focused laser, are melted and are connected by melting metallurgy. With the aid of laser beam generating, polycrystalline and directionally solidified as well as, in principle, also monocrystalline replacement parts may be produced from almost any kind of material.

Within the present context, with the aid of the rapid manufacturing process, a self-contained replacement part may be produced for the component part of the gas turbine that is to be repaired or modified. Laser beam generation, selective laser sintering, selective laser melting, comparable methods, etc., may be used as rapid manufacturing process within the present context for producing the replacement part.

After the production of the replacement part that is to be produced, and before the integration of the replacement part into the component part that is to be repaired or modified, a reworking of the replacement part that has been produced may take place. A reworking of the replacement part produced may not be absolutely necessary, but it may be of advantage under certain circumstances. Thus, for example, an aftertreatment or surface treatment of the replacement part produced may be carried out with the purpose of cleaning the replacement part produced, of improving the surface quality, of optimizing the mechanical-technological properties of the replacement part, etc. Among the properties-improving measures for reworking are, for example, heat treatment, such as solutionizing treatment, age-hardening, etc. Hot isostatic pressing may also be carried out as a reworking of the replacement part. This hot isostatic pressing may be advantageous especially if porosities, such as the ones that may appear in selective laser sintering, are to be closed.

The replacement part produced and reworked, if necessary, may then be integrated or installed in the component part that is to be repaired or modified. Thus, with the aid of a bonding method, the replacement part produced may be integrated into the component part of the gas turbine. As the bonding method, laser welding, WIG welding, EB welding, soldering, etc., may be provided. After the bonding process, reworking of the repaired or modified component part may take place. In the case of the reworking, in turn, for example, heat treatment or surface treatment may be performed on the repaired component part. One may also subject the repaired or modified component part to a coating method.

Using the method hereof, it may be possible to make a quick repair of component parts of a gas turbine, e.g., of aircraft power plants. Replacement parts may be produced with great precision and great geometrical complexity. By using the method hereof, one may do without the model building and mold building that may be conventionally required. The production of the replacement part may take place directly from 3D CAD data that are converted to a machine-readable data record. Instances of damage may be repaired which, because of their size and their geometrical complexity, may not have been repairable by conventional techniques. The connecting region of replacement part and component part to be repaired may be set into zones of the component part that are subject to low stress. Moreover, it is possible to produce the replacement parts of the same or a different material from that of the component part that is to be repaired. The method hereof may provide possibilities for repairing component parts of a gas turbine.

Figure 3:
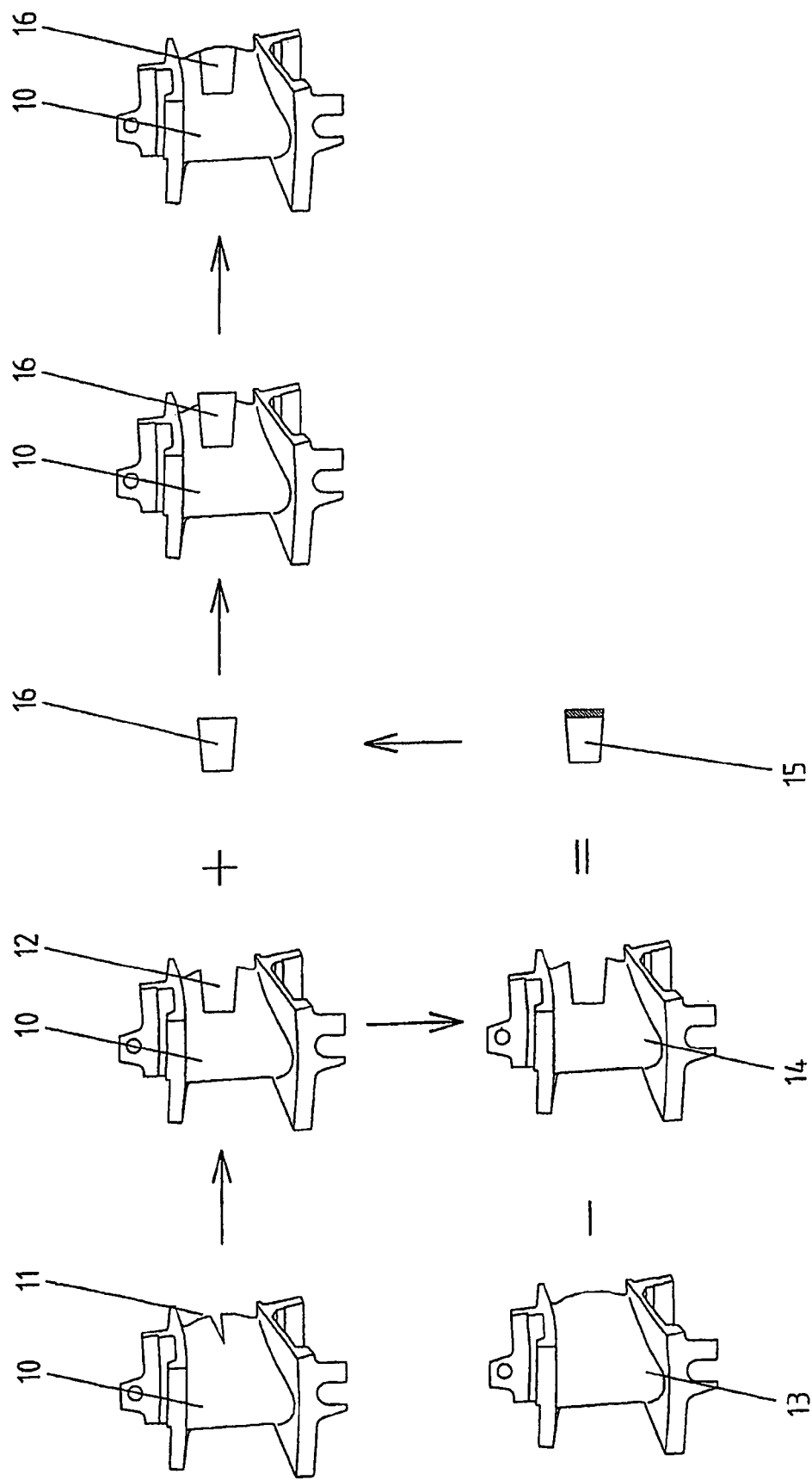
FIG. 3 illustrates an example of the method.

FIG. 3 clarifies the method hereof, in the light of exemplary embodiments. Thus, in the exemplary embodiment illustrated in FIG. 3, a stationary component part 10, e.g., a stationary stator blade of an aircraft power plant, is repaired. FIG. 3 illustrates component part 10 having a damaged section 11, in damaged section 11 there being a wide-gap crack having a crack width of more than 1 mm. Such a wide-gap crack, in a material that is susceptible to heat cracking, may not be repairable by conventional repair methods. In the exemplary embodiment illustrated in FIG. 3, one assumes that impact damage of component part 10 is involved in the damage to damaged section 11, which may not occur very frequently. Accordingly, a non-systematic damage to the component part may exist.

Damaged section 11 and a tolerance section adjacent to damaged section 11 are roughed out of component part 10 in an individual manner, for example, by electric discharge machining. Accordingly, no device is used that is adapted to the special damage of component part 10. FIG. 3 illustrates component part 10 having a repair section 12 that is cut out of component part 10, repair section 12 including damaged section 11 and the tolerance section adjacent to damaged section 11.

In the exemplary embodiment illustrated in FIG. 3, there is a data record for the undamaged component part. FIG. 3 makes this data record visual as CAD data record 13 of undamaged component part 10. Conditioned upon the fact that, as shown above, there is a nonsystematic case of damage of damaged component part 10, reverse engineering of damaged component part 10 is carried out. The reverse engineering is carried out on damaged component 10, from which repair section 12 has been cut out. Using computer tomography and subsequent surface feedback, a CAD data record 14 is determined for the damaged component part. Subsequently, a difference is carried out between CAD data record 13 of the undamaged component part and CAD data record 14 of the damaged component part. As the result, one obtains a CAD data record 15 of the replacement part that is to be produced.

CAD data record 15 of the replacement part that is to be produced may be submitted to a manual aftertreatment. Furthermore, by the reworking of the CAD data record for the component part to be produced, in the exemplary embodiment illustrated, a processing addition is provided for replacement part 16 that is to be produced, in order to be able to produce a transition in the outer contour, between the component part and the replacement part, without the occurrence of an offset. Neighboring CAD data record 15 for replacement part 16, that is to be produced, is converted to a machine-readable data record, and, by using a rapid manufacturing process, replacement part 16 is then produced.

In the exemplary embodiment, in the instance of component part 10 that is to be produced, a stator blade is involved, based on a nickel alloy. As the rapid manufacturing process, selective laser sintering is used. Fine-grained nickel-based powder having a grain size of 10 to 80 μm and an oxygen content of less than 200 ppm is placed into a sintering chamber of a laser sintering apparatus, and this space is filled with argon or another inert, or reducing gas. Following this, an exposure is made, using a $CO_2$ laser having a beam output power of, e.g., 200 W and a focus diameter of, e.g., 0.36 mm. After the exposure of the first layer, a platform is lowered by, e.g., 20 to 80 μm, using a sweeping strip or wiper, nickel-based powder is applied once more, and then, appropriately to the contour of the second layer, exposure is repeated. This procedure is repeated until replacement part 16, that is to be produced, is finished. In this connection, it should be noted that a preheating or postheating of the substrate and/or of the powder may be advantageous to the sintering procedure. The preheating or the postheating may be applied inductively via the substrate, or directly by the laser, by a pre-exposure using a defocused beam or by the use of a bifocal optical system.

Replacement part 10 thus produced may be submitted to a reworking, for example, in an unencapsulated hot isostatic pressing.

Reworked replacement part 16 is then integrated, as illustrated in FIG. 3, into component part 10 that is to be repaired, e.g., into repair section 12 of component part 10. According to the exemplary embodiment illustrated, this is done by tacking replacement part 16 into the stator blade using spot welding, is furnished with a suitable solder mixture for joint soldering, and is soldered in a vacuum oven. Diffusion annealing is then applied.

After replacement part 16 has been integrated into component part 10 that is to be repaired, there is a reworking of the component part that is to be repaired. In the exemplary embodiment illustrated in FIG. 3, during the reworking, the outer contour of replacement part 16, that is integrated into component part 10, is reworked. In the exemplary embodiment illustrated, this is done by mechanical grinding. Finally, repaired component part 10 is coated.

LIST OF REFERENCE NUMERALS component part 10
section 11
repair section 12
CAD data record 13
CAD data record 14
CAD data record 15
replacement part 16

What is claimed is:

1. A method for at least one of (a) repairing and (b) modifying a component part of a gas turbine, comprising:
    roughing out of the component part at least one damaged section of the component part;
    producing a replacement part by a rapid manufacturing process, including determining a CAD data record for the production of the replacement part by the rapid manufacturing process, by subtracting a CAD record of the component part having the at least one damaged section roughed out in the roughing out step from a CAD data record of one of (a) an undamaged component part and (b) a new part; and
    integrating the replacement part produced in the producing step into the component part.

2. The method according to claim 1, wherein the gas turbine is arranged as a gas turbine of an aircraft power plant.

3. The method according to claim 1, wherein the roughing out step includes cutting the damaged section out of the component part and cutting a tolerance section adjacent to the damaged section out of the component part.

4. The method according to claim 1, wherein the producing step includes converting the CAD data record for the production of the replacement part by the rapid manufacturing process to a machine data record.

5. The method according to claim 1, wherein the producing step includes:
    checking whether the CAD data record of the one of (a) the undamaged component part and (b) the new part exists; and
    if the CAD data record of the one of (a) the undamaged component part and (b) the new part does not exist, reverse engineering the one of (a) the undamaged component part and (b) the new part to determine the CAD data record of the one of (a) the undamaged component part and (b) the new part.

6. The method according to claim 1, wherein the producing step includes:
    checking, firstly, whether a systematic damage of the component part exists and, secondly, whether a geometry of the component part is reproducible;
    if at least one of (a) no systematic damage exists and (b) the geometry of the component part is not reproducible, reverse engineering the component part to determine the CAD record of the component part having the at least one damaged section roughed out in the roughing out step.

7. The method according to claim 6, wherein, if systematic damage exists and the geometry of the component part is reproducible, the producing step includes determining the CAD data record for the production of the replacement part by statistical evaluation of a characteristic appearance of damage.

8. The method according to claim 1, wherein the rapid manufacturing process includes selective laser sintering.

9. The method according to claim 1, wherein the rapid manufacturing process includes selective laser melting.

10. The method according to claim 1, wherein the rapid manufacturing process includes laser beam generation.

11. The method according to claim 1, further comprising reworking the replacement part before the integrating step.

12. The method according to claim 1, wherein the replacement part is integrated into the component part in the integrating step by a bonding process.

13. The method according to claim 12, further comprising reworking the component part after the integrating step.

* * * * *